United States Patent
Ema

[19]

[11] Patent Number: 6,037,606
[45] Date of Patent: Mar. 14, 2000

[54] CONSTRUCTION OF AND METHOD OF MANUFACTURING AN MIM OR MIS ELECTRON SOURCE

[75] Inventor: Takahiro Ema, Tokyo, Japan

[73] Assignee: NEC Corporation, Tokyo, Japan

[21] Appl. No.: 09/187,738

[22] Filed: Nov. 9, 1998

[30] Foreign Application Priority Data

Nov. 10, 1997 [JP] Japan ................................. 9-306838

[51] Int. Cl.⁷ ............................. H01L 29/06; H01L 39/00
[52] U.S. Cl. ................................................ 257/37; 257/30
[58] Field of Search .............................. 257/30, 37, 38, 257/39

[56] References Cited

U.S. PATENT DOCUMENTS

| | | |
|---|---|---|
| 3,310,685 | 3/1967 | Schmidler . |
| 3,319,137 | 5/1967 | Brannstein et al. . |
| 3,816,845 | 6/1974 | Cuomo et al. . |
| 4,016,589 | 4/1977 | Tanimura et al. . |
| 4,472,726 | 9/1984 | DiMaria et al. . |
| 5,077,762 | 12/1991 | Morimoto et al. . |
| 5,281,897 | 1/1994 | Fimml . |
| 5,291,274 | 3/1994 | Tamura ...................................... 257/30 |
| 5,401,981 | 3/1995 | Michael et al. ........................... 257/30 |
| 5,464,989 | 11/1995 | Mori et al. ................................. 257/30 |

FOREIGN PATENT DOCUMENTS

8-315722  11/1996  Japan .

*Primary Examiner*—Ngan V. Ngo
*Attorney, Agent, or Firm*—Sughrue, Mion, Zinn, Macpeak & Seas, PLLC

[57] ABSTRACT

In an MIM or MIS electron source that is formed by a first conductive layer 101, an insulating layer 103 that is formed onto said first conductive layer 101, and a second conductive layer 104 that is formed onto said insulating layer 103, wherein a voltage is applied between said first and second conductive layers 101, 104, so as to cause a tunneling current to occur in said insulating layer 103, the film thickness of said insulating layer 103 and the film thickness of said second conductive layer 104 are formed so as to be uniform.

13 Claims, 6 Drawing Sheets

702 FIRST CONDUCTIVE LAYER
701 INSULATING LAYER
703 SECOND CONDUCTIVE LAYER

CONSTRUCTION OF AND METHOD OF MANUFACTURING AN MIM OR MIS ELECTRON SOURCE

BACKGROUND OF THE INVENTION

1. Field of the Invention

The present invention relates to the construction of an MIM or MIS electron source (hereinafter referred to as an MIM/MIS electron source) and to a method of manufacturing an MIM/MIS source, and more particularly it relates to the construction and method of manufacturing an MIM/MIS electron source that emits a desired electron distribution and emits electrons uniformly.

2. Background of the Invention

Figure 7:
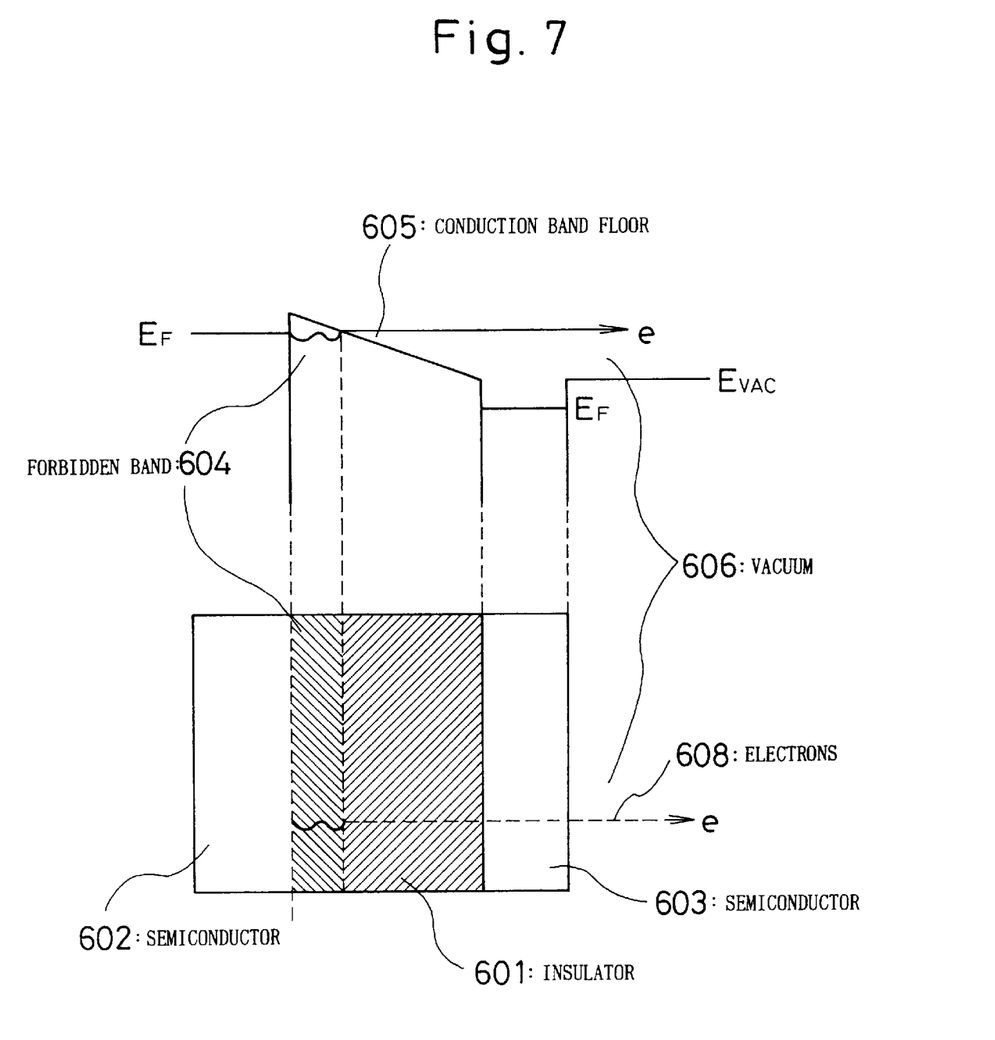
FIG. 7 is a potential diagram that illustrates the prior art.

An MIM(metal-insulator-metal)/MIS (metal-insulator-semiconductor) electron source is a surface emission type of electron source having a three-layer structure, in which an insulating layer is sandwiched by either a metal or a semiconductor. It enables the achievement of a uniform emission of electrons over a large surface area and, because this electron source is highly immune to surface impurities, it is expected to be suitable for such applications as electron beam writing apparatuses and displays. FIG. 7 illustrates the principle of this electron source. By applying a voltage across the metal or semiconductor 602 and 603 which sandwiches the insulating layer 601, electrons 608 are Fowler-Nordheim tunneled through the insulation forbidden band 604 (tunnel effect) and electric field that occurs within the insulation conduction band 605 causing electron to accelerate and move thereof from the metal or semiconductor 602, which has a high electron potential, toward the metal 603, which has a low electron potential. Part of these electrons pass through the semiconductor 603 and are emitted into the vacuum 606.

In the past, various materials have been used in the above to the present in wide-ranging research. For example, an Al—$Al_2O_3$—Au structure is shown on page 568 of Vol. 32 Issue 8 (1963) of Applied Physics, and a Si—$SiO_2$—Al structure and an nSi—$SiO_2$-nonSi-nSi structure is indicated on page 2096 of Issue B14 (1996) of Journal of Vacuum Science and Technology.

In addition to the two above-noted citings, there is also an indication of the shape of a three-layer structure, on page 359 of Electronic Engineering 11 (1990), and on page 801 of Issue B12 (1994) Of Journal of Vacuum Science and Technology. In particular, a structure for achieving a desired beam cross-sectional shape which is shown in FIG. 8, is indicated on page 359 of Electronic Engineering 11 (1990), and on page 2201 of Issue B13 (1995) Of Journal of Vacuum Science and Technology.

Figure 8:
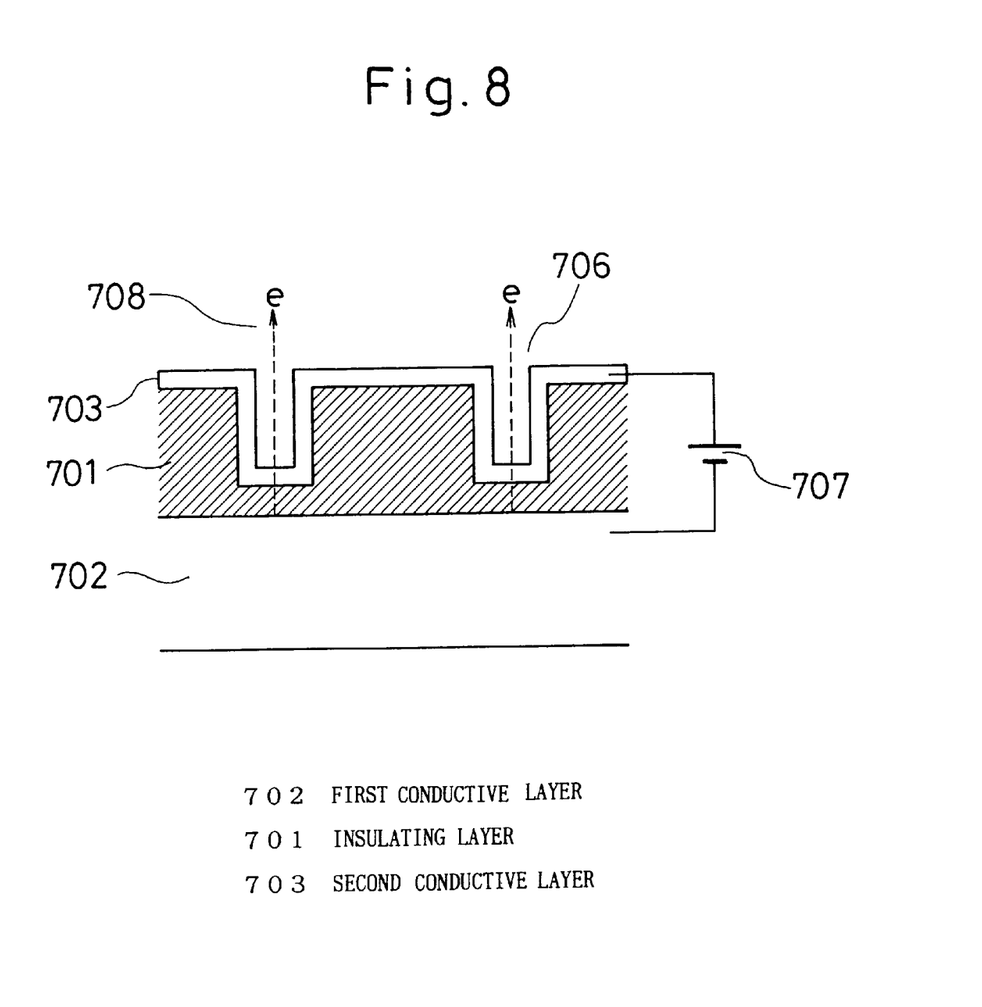
FIG. 8 is a drawing that shows the structure of the prior art.

In FIG. 8, the reference numeral 702 denotes a first conductive layer, 701 is an insulating layer that is formed on the first conductive layer 702, and 703 is a second conductive layer that is formed on the insulating layer 701. In this MIM/MIS electron source, the structure is such that only electrons 708 from thin part of the intermediate insulating layer 701 are allowed to be released. In the Japanese Unexamined Patent Publication (KOKAI) H8-315722, there is disclosure of an example of forming the above-noted three-layer structure microscopically using minute particles.

However, in the above-noted prior art, because of a step that exists in the metal or semiconductor layer which forms the edge of the beam, the change in the film thickness changes the shape of the beam edge, thereby making it difficult to achieve the desired pattern shape.

In the example in the Japanese Unexamined Patent Publication H8-315722, in which minute particles are used, because of the difficulty in achieving a uniform disposition of two types of particles, and because the three-layer structure is microscopically oriented in all directions, electrons are emitted in all directions, the result being that it is difficult to achieve a uniform electron emission of a desired beam shape.

3. SUMMARY OF THE INVENTION

Accordingly an object of the present invention is to improve on the above-noted drawbacks of the prior art and, in particular, to provide an MIM/MIS electron source structure and manufacturing method therefor, this electron source achieving a uniform energy and also achieving an electron beam of a desired pattern.

Another object of the present invention is to provide an electron source structure that improves the resolution of the edge shape of the electron beam, and a method of manufacturing this electron source.

In order to achieve the above-noted objects, the present invention adopts the following basic technical constitution.

Specifically, a first aspect of an MIM/MIS electron source according to the present invention is formed by a first conductive layer, an insulating layer that is formed on the first conductive layer, and a second conductive layer that is formed on the insulating layer, a voltage being applied between the first conductive layer and the second conductive layer, so that a tunnel current occurs within the insulating layer, the film thickness of the insulating layer and the film thickness of the second conductive layer being formed so as to be uniform.

In a second aspect of the present invention, there is a step formed in the first conductive layer.

The third aspect of the present invention is an MIM/MIS electron source formed by a first conductive layer, an insulating layer that is formed on the first conductive layer, and a second conductive layer that is formed on the insulating layer, a voltage being applied between the first conductive layer and the second conductive layer, so that a tunnel current occurs within the insulating layer, the above-noted insulating layer being formed of at least two types of materials having different potential energies from the Fermi potential to the conduction band floor.

In the fourth aspect of the present invention, the MIM/MIS structure is formed by a first conductive layer, an insulating layer that is formed on the first conductive layer, and a second conductive layer that is formed on the insulating layer, a voltage being applied between the first conductive layer and the second conductive layer, so that a tunnel current occurs within the insulating layer, the film thickness of the second conductive layer being uniform and the surface thereof being flat.

In a fifth aspect of the present invention, the insulating layer is formed as a laminate of at least two insulating layers.

In a sixth aspect of the present invention, a first surface part of the first conductive layer is covered by a first insulating layer, and a second surface part thereof is covered by a second insulating layer.

In a seventh aspect of the present invention, the boundary between the insulating layer and the second conductive layer is formed so as to be flat.

In an eight aspect of the present invention, the first conductive layer is formed by silicon or aluminum, and the insulating layer is formed of aluminum oxide or of silicon oxide.

The first aspect of a method of manufacturing an MIM/MIS electron source according to the present invention is a method for manufacturing an MIM/MIS that is formed by a first conductive layer, an insulating layer that is formed on the first conductive layer, and a second conductive layer that is formed on the insulating layer, a voltage being applied between the first conductive layer and the second conductive layer, so that a tunnel current occurs within the insulating layer, this method including a first step of forming said first conductive layer; a second step of depositing an insulating material onto said first conductive layer; a third step of exposing said first conductive layer using CMP or etch back; a fourth step of forming said second insulating layer on said insulating material and first conductive layer; and a fifth step of forming a second conductive layer on said second insulating layer.

The second aspect of a method of manufacturing an MIM/MIS electron source structure according to the present invention is a method for manufacturing an MIM/MIS that is formed by a first conductive layer, an insulating layer that is formed on the first conductive layer, and a second conductive layer that is formed on the insulating layer, a voltage being applied between the first conductive layer and the second conductive layer, so that a tunnel current occurs within the insulating layer, this method including a first step of depositing a first insulating layer on said first conductive layer; a second step of processing said first insulating layer; a third step of depositing said second insulating layer on said first insulating layer; a fourth step of exposing said first conductive layer using CMP or etch back; and a fifth step of forming a second conductive layer on said first and second insulating layers.

In a third aspect of the above-noted manufacturing method, the film thickness of the second conductive layer is uniform and the surface thereof is flat.

An MIM/MIS electron source according to the present invention has a first conductive layer, an insulating layer that is formed on the first conductive layer, and a second conductive layer that is formed on this insulating layer, a voltage being applied between the first conductive layer and the second conductive layer, so that a tunnel current occurs within the insulating layer, wherein the film thickness of the insulating layer and the film thickness of the second conductive layer are formed so as to be uniform, this resulting in a uniform thickness in the part that passes electrons, so that the probability of tunneling to within the insulating layer is uniform within the part that passes electrons. Additionally, because the film thickness of the first conductive layer is uniform, the probability of an electron that is injected from the insulating layer passing into the vacuum is uniform. It is therefore possible to achieve an electron emission beam that has a uniform energy and good directivity.

Furthermore, in an MIM/MIS electron formed by a first conductive layer, an insulating layer that is formed over the first conductive layer, and a second conductive layer that is formed over the insulating layer, in which a voltage is applied between the first conductive layer and the second conductive layer, so as to cause a tunnel current in the above-noted insulating layer, by forming the insulating layer from two materials having different potential energies from the Fermi potential to the conduction band floor, since the two types of insulating materials have different Fowler-Nordheim tunneling probabilities, by using a material having a high tunneling probability at the bottom of the electron emitting part and a material have a low tunneling probability at the bottom of the part that does not emit electrons, it is possible to make the insulating layer thickness uniform within the surface, the result being that it is possible to form a conducting layer that is flat and has a uniform film thickness over the entire surface of the insulating layer.

For this reason, it is possible to achieve an emitted electron beam that has uniform energy and that has good directivity.

5. DESCRIPTION OF THE PREFERRED EMBODIMENTS

Preferred embodiments of the present invention are described in detail below, with reference being made to relevant accompanying drawings.

FIG. 1 and FIGS. 2(a)–2(d) are drawings that show the first example of a MIM/MIS electron source and manufacturing method therefor according to the present invention, these drawings showing a MIM/MIS electron source that is formed by a first conductive layer 101, an insulating film 103 that is formed on the first conductive layer 101, and a second conductive layer 104 that is formed on this insulating layer 103, wherein a voltage is applied between the first conductive layer 101 and the second conductive layer 104, so as to cause a tunnel current to flow within the insulating layer 103. In this MIM/MIS electron source, the film thickness of the insulating layer 103 and the film thickness of the second conductive layer 104 are formed so as to be uniform.

Figure 1:
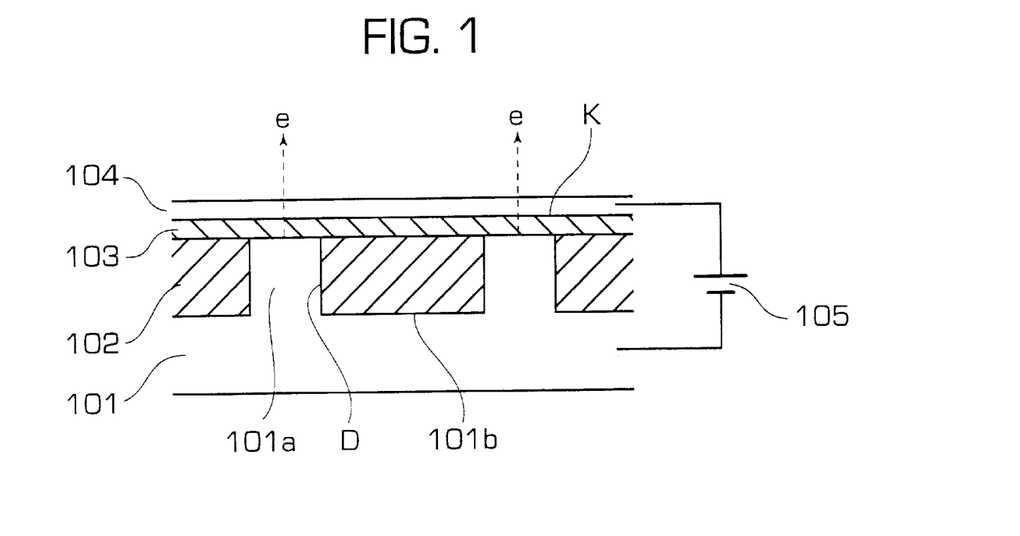
FIG. 1 shows the structure of the first example of the present invention.

More specifically with regard to the above-noted first example of the present invention, silicon which is sufficiently doped with an n-type impurity, for example, is used as the lower conductive layer 101, a protruding part 101a being formed as an electron-emitting part on the lower conductive layer, and a step D of 10 to 100 nm being formed so as to form a depressed part 101b as a non-electron-emitting part on the conductive layer 101. On the flat surface that is formed by the intermediate insulating layers 102 and 103, a gold layer of 5 to 100 nm is formed as a conductive layer. The thickness of the insulating layer 103 at which electrons pass is 5 to 20 nm. These conducting layers, a power supply 105 having a polarity such that the upper conductive layer 104 is at a more positive potential than the lower conductive layer 101 is used, a voltage of 5 to 20 volts usually being applied therebetween, so that electrons supplied form the protruding part 101a of the lower conductive layer exhibit Fowler-Nordheim tunneling through the insulating layer 103, and then pass completely through the upper conductive layer 104 so as to be released into the vacuum from the surface thereof.

An example of the method of manufacturing the above-noted structure is shown in FIGS. 2(a)–2(d).

Figure 2A:
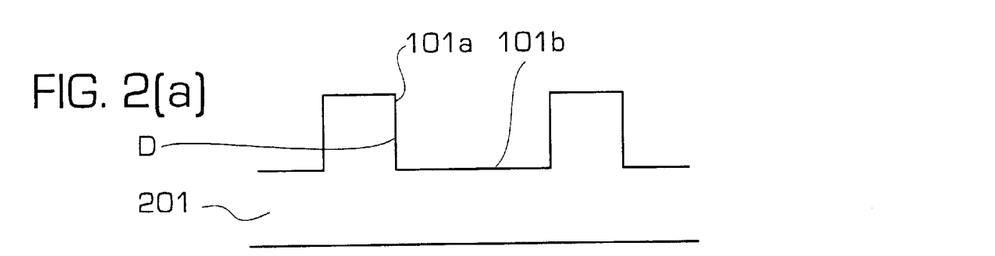
FIGS. 2(a)–2(d) show the manufacturing processes for the first example of the present invention.
Figure 2B:
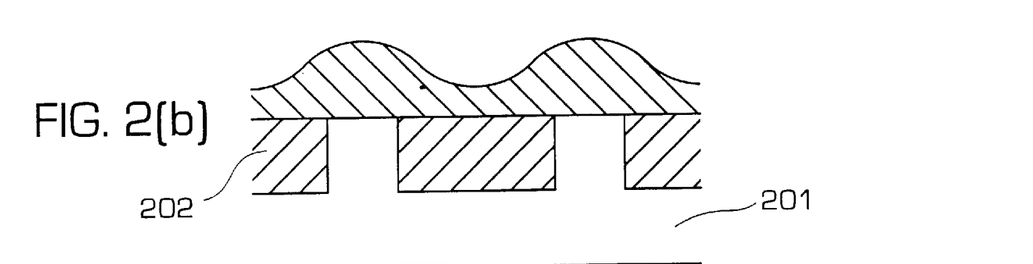
Figure 2C:
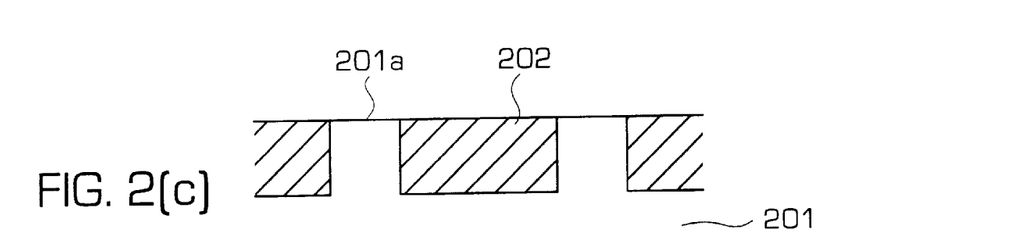
Figure 2D:
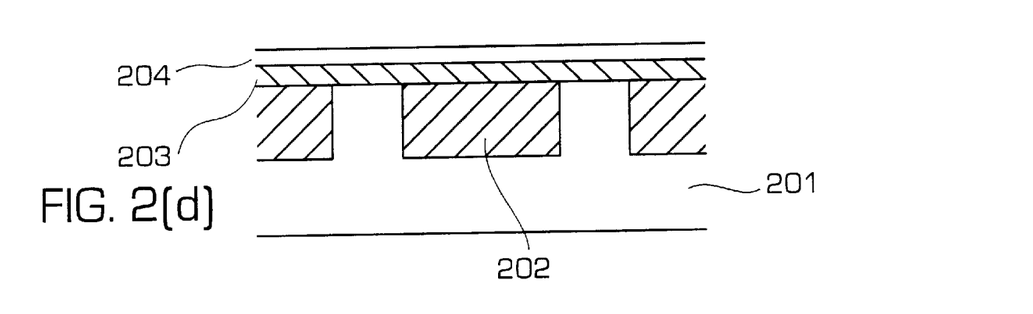

Photoresist is applied to a silicon substrate 201, which has been sufficiently doped with n-type impurity, this is patterned using lithography, and $SF_6$ or $O_2$ gas or the like is used to perform dry etching, as shown in FIG. 2(a). A CVD $SiO_2$ or SOG film 202 is formed onto the silicon substrate 201, so as to cover the entire surface thereof, as shown in FIG. 2(b). CMP or etching or the like is then used to achieve flatness while exposing the protruding part 201a of the silicon substrate 201, as shown in FIG. 2(c). Additionally, after forming an insulating layer 203 of $Al_2O_3$ or $SiO_2$, the upper conductive layer 204 is formed, as shown in FIG. 2(d). There is no restriction to the use of $SiO_2$ or $Al_2O_3$ as the material for the insulating layer 203, nor is the upper conductive layer 204 restricted to being made of aluminum or gold, any material that enables the use of the Fowler-Nordheim tunneling mechanism being usable.

Thus, a feature of the above-noted structure is that the insulating layer is formed by a laminate of at least two insulating layers. Additionally, the surface of the second conductive layer is formed so as to be flat.

Additionally, the boundary surface K between the insulating layer 103 and the second conductive layer 104 is formed so as to be flat.

A method of manufacturing a MIM/MIS electron source according to the present invention has a first step of forming a step in the first conductive layer 101, a second step of depositing an insulating material 102 onto the first conductive layer 101, a third step of exposing the first conductive layer 101 by CMP or etch back, a fourth step of forming a second insulating layer 103 on the above-noted insulating material 102 and first conductive layer 101, and a fifth step of forming a second conductive layer 104 on the second insulating layer 103.

Next, the second example of the present invention will be described, with reference being made to FIG. 3 and FIGS. 5(a)–6(c).

Figure 3:
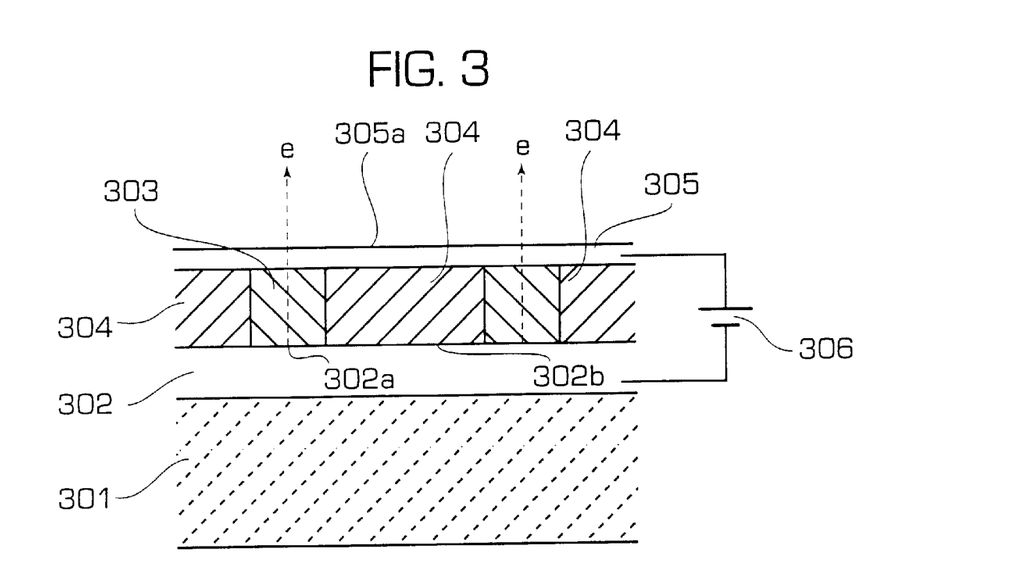
FIG. 3 shows the structure of the second example of the present invention.

These drawings show the structure of the second example of the present invention, which is an MIM/MIS electron source that is formed by a first conductive layer 302, insulating layers 304 and 303 that are formed on the first conductive layer 302, and a second conductive layer 305 that is formed on the insulating layers, wherein a voltage is applied between the first conductive layer 302 and the second conductive layer 305 so as to cause a tunneling current to flow in the above-noted insulating layer. In the structure shown, the insulating layer is formed by the insulating layers 304 and 303, which are made from at least two materials, these having different potential energies from the Fermi potential to the conductance band floor.

In more detail, in the second example of the present invention a lower conductive layer 302 is formed on a quartz substrate 301 by vapor deposition of aluminum 302.

With an aluminum thickness of approximately 100 nm to 10 μm, as intermediate insulating layers, an insulating layer 303 of aluminum oxide is formed on a part at which a tunnel current occurs, and an insulating layer 304 of silicon oxide is formed on a part at which tunneling current does not occur. The film thicknesses of the insulating layers 303 and 304 are 5 to 20 nm, this being uniform between the part 303 that passes electrons and the part there surrounding, the surface thereof being flat. A gold layer of thickness 5 to 100 nm is formed as an upper conductive layer 305. Between these two conductive layers, a power supply 306 with a polarity such that the upper conductive layer 305 is more positive than the lower conductive layer 302 is used to apply a voltage therebetween, this voltage usually being in the range of 5 to 20 V, so that electrons supplied from the lower conductive layer 302 are Fowler-Nordheim tunneled through the insulating layer 303 and further so that they pass completely through the upper conductive layer 305 and are released into the vacuum from the surface thereof.

Figure 4:
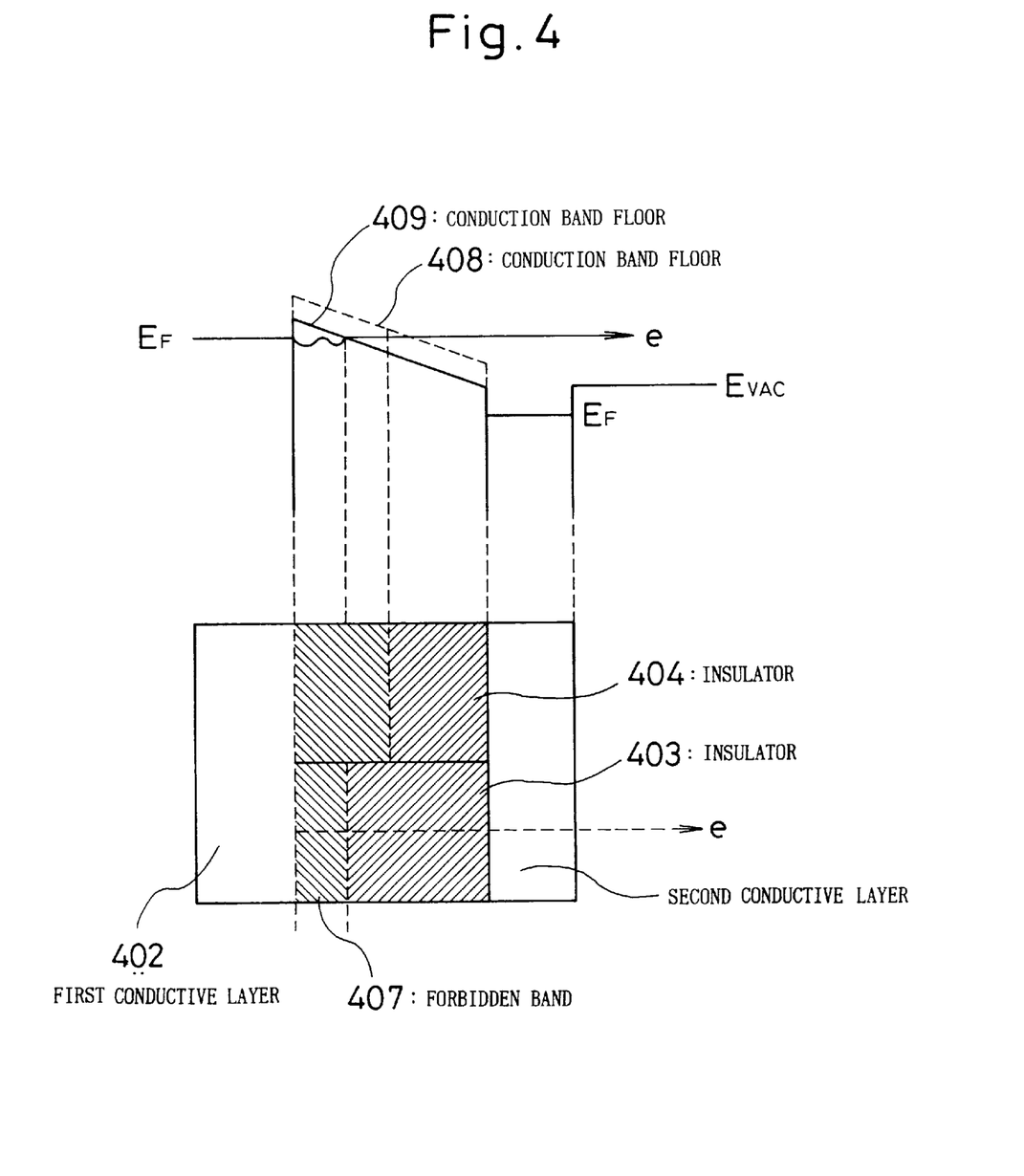
FIG. 4 is a potential diagram that illustrates the operating principle of the second example of the present invention.
Figure 5:
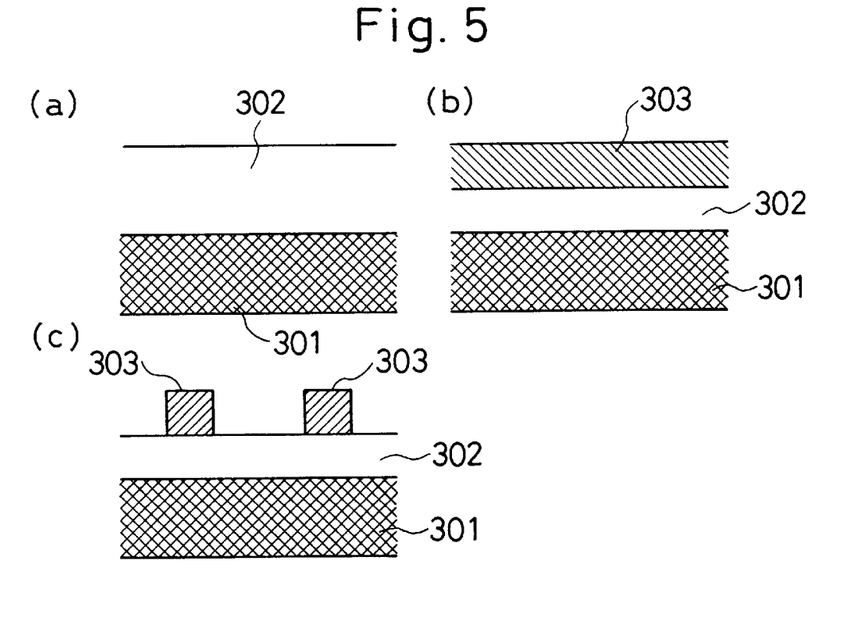
FIGS. 5(a)–5(c) show the manufacturing processes of the second example of the present invention.
Figure 6:
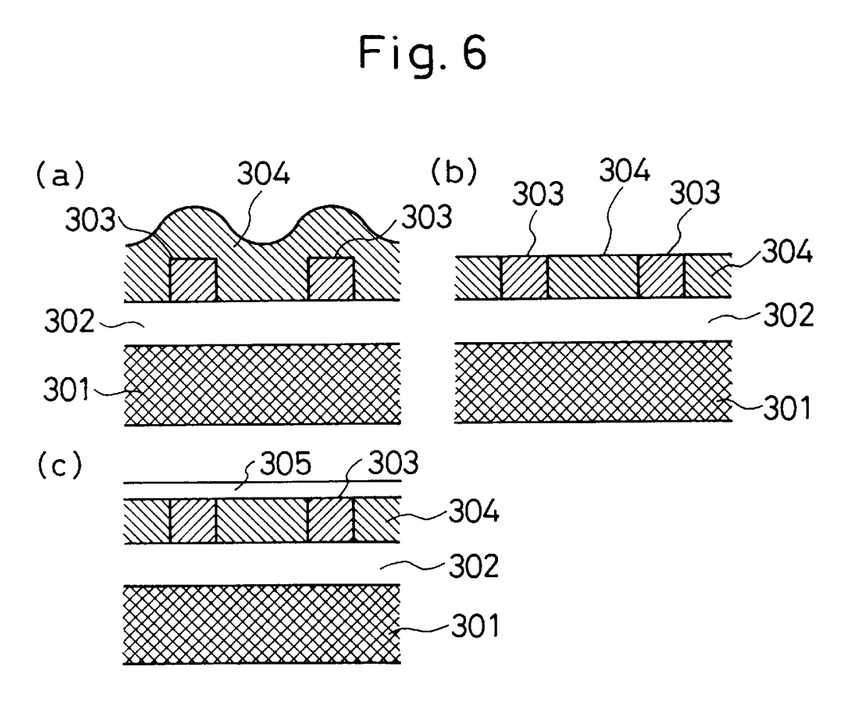
FIGS. 6(a)–6(c) show the manufacturing processes that follow those shown in FIG. 5.

FIG. 4 is an electron potential diagram. With an appropriate voltage applied between the conductive layers 402 and 405, a potential gradient is developed therebetween, in a direction of a line running between the layers, the forbidden band 407 of the aluminum oxide 403 becoming thin enough to enable tunneling, so that electrons tunnel from the lower conductive layer 402 to the insulation conduction band. Additionally, electrons are accelerated through the insulation layer conduction band, pass through the upper conductive layer 405, and are released into the vacuum from the surface thereof. Because the conduction band floor 408 of the silicon oxide 404 is at a potential that is 1.2 eV higher than the conduction band floor 409 of the aluminum oxide, Fowler-Nordheim tunneling does not occur in the silicon oxide. As a result, electrons are selectively passed only through the part of the insulation layer in which aluminum oxide is used.

FIGS. 5(a)–5(c) and 6(a)–6(c) show an example of the manufacture of the above-noted structure. CVD, vapor deposition, or sputtering or the like is used to form an aluminum conductive layer 302 on a quartz substrate 301, as shown in FIG. 5(a). Next, the resulting surface is anodized or thermally oxidized, so as to oxidize only the surface, as shown in FIG. 5(b). Next, patterning is done by using lithography, after which etching is performed so as to form the insulating layer 303, as shown in FIG. 5(c). Additionally, CVD is used to generate a $SiO_2$ or SOG film 304 onto the conductive layer 302 and insulating layer 303, thereby sufficiently covering the entire surface thereof, as shown in FIG. 6(a). CMP, etch back or the like is then used to flatten the insulating layers 303 and 304 as the aluminum oxide insulating layer 303 is exposed, as shown in FIG. 6(b). Finally, an upper conductive layer 305 is formed over the entire surface of the insulating layer in FIG. 6(c). The material used to fabricate these insulating layers 303 and 304 is not restricted to $SiO_2$ or $Al_2O_3$, nor is there a restriction to the use of aluminum or gold as the upper conductive layer, any materials that enable use of the Fowler-Nordheim tunneling mechanism and use of a difference in insulator band gap being usable.

Thus, in the second example of the present invention, a feature is that the film thickness of the second conductive layer 305 is uniform and that the surface 305a is flat.

Another feature is that the first surface part 302a is covered by the first insulating layer 303, and the second surface part 302b is covered by the second insulating layer 304.

This example of a manufacturing method for an MIM/MIS electron source includes a first step of depositing a first insulating layer 303 onto a first conductive layer 302, a second step of processing the first insulating layer 303, a third step of depositing a second insulating layer 304 onto the first insulating layer, a fourth step of exposing the first insulating layer 303 using CMP or etch back, and a fifth step of forming a second conductive layer 305 onto the first and second insulating layers 303 and 304.

In an MIM/MIS electron source structure and manufacturing method therefor according to the present invention, because the film thickness of an insulating layer and the film thickness of a second conductive layer are formed so as to be uniform, the probability of tunneling into the insulating layer is uniform within the part that passes electrons. Additionally, because the film thickness of the upper conductive layer is uniform, the ratio of passage of electrons injected from the insulating layer into the vacuum is uniform. As a result, it is possible to obtain an electron beam that has uniform energy and good directivity.

Also, because the insulation layer is formed from at least two types of materials that have different potential energies from the Fermi potential to the conduction band floor, these two different insulation layers have different Fowler-Nordheim tunneling probabilities, so that by using a material having a high tunneling probability at the bottom of the electron emitting part and a material having a low tunneling probability at the bottom of the part that does not emit electrons, it is possible to make the insulating layer thickness uniform within the surface, the result being that it is possible to form a conducting layer that is flat and has a uniform film thickness over the entire surface of the insulating layer.

For this reason, it is possible to achieve an electron beam that has uniform energy and good directivity.

What is claimed is:

1. A MIM or MIS electron source comprising: a first conductive layer, an insulating layer that is formed onto said first conductive layer, and a second conductive layer that is formed onto said insulating layer, wherein at least one step portion is formed in said first conductive layer, and, when a voltage is applied between said first and second conductive layers such that said second conductive layer is at a more positive potential than said first conductive layer, a tunneling current occurs predominantly in a region of said insulating layer which is disposed on a top surface of said step portion.

2. A MIM or MIS electron source comprising: a first conductive layer, a first insulating layer that is formed onto a first portion of said first conductive layer, a second insulating layer that is formed onto a second portion of said first conductive layer, and a second conductive layer that is formed onto at least said second insulating layer, wherein, when a voltage is applied between said first and second conductive layers, a tunneling current occurs predominantly in said second insulating layer and not in said first insulating layer, and wherein said first insulating layer is formed by a first type of material and said second insulating layer is formed by a second type of material, said first type of material having a higher potential energy, from the Fermi potential to the conduction band floor, than said second type of material.

3. The MIM or MIS electron source according to claim 1 wherein the film thickness of said second conductive layer is uniform, and the surface thereof is flat.

4. The MIM or MIS electron source according to claim 1, wherein said insulating layer is formed as a laminate of at least a first and a second insulating layers.

5. An MIM or MIS electron source according to claim 1, wherein a first surface part of said first conductive layer is covered by a first insulating layer and a second surface part of said first conductive layer is covered by a second insulating layer, and wherein said second surface part is said top surface of said step portion.

6. The MIM or MIS electron source according to claim 1, wherein a boundary surface between said insulating layer and said second conductive layer is formed so as to be flat.

7. The MIM or MIS electron source according to claim 1, wherein said first conductive layer is formed on silicon or aluminum, and said insulation layer is formed of aluminum oxide or silicon oxide.

8. The MIM or MIS electron source according to claim 4, wherein said first insulating layer is formed onto said first conductive layer other than on said top surface of said step portion, and said second insulating layer is formed at least on said top surface of said step portion.

9. The MIM or MIS electron source according to claim 8, wherein a top surface of said first insulating layer and said top surface of said step portion form a surface which is substantially flat, and said second insulating layer is formed onto said surface which is substantially flat.

10. The MIM or MIS electron source according to claim 8, wherein a film thickness of said second insulating layer and a film thickness of said second conductive layer are formed so as to be uniform.

11. The MIM or MIS electron source according to claim 2, wherein a boundary surface between an insulating layer, formed by said first and second insulating layers, and said conductive layer is substantially flat.

12. The MIM or MIS electron source according to claim 2, wherein a film thickness of said first insulating layer is substantially the same as a film thickness of said second insulating layer.

13. A MIM or MIS electron source comprising; a first conductive layer, an insulating layer that is formed onto said first conductive layer, and a second conductive layer that is formed onto said insulating layer, and when a voltage is applied between said first and second conductive layers such that said second conductive layer is at a more positive potential than said first conductive layer, wherein a tunneling current occurs in the first portion of said insulating layer and not in said second portion of said insulating layer, said second portion having a higher potential energy, from the Fermi potential to the conduction band floor, than said first portion, and further wherein the film thickness of said second conductive layer is formed so as to be uniform, a surface thereof is formed so as to be flat, a boundary surface between said insulating layer and said first conductive layer and a boundary surface between said insulating layer and said second conductive layer are formed so as to be flat.

* * * * *